United States Patent
Moghaddas (10) Patent No.: US 10,128,892 B1
(45) Date of Patent: Nov. 13, 2018

(54) GENERIC SERDES TUNING MODULE

(71) Applicant: Infinera Corp., Annapolis Junction, MD (US)

(72) Inventor: John Moghaddas, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/949,637

(22) Filed: Apr. 10, 2018

(51) Int. Cl.
*H04B 1/38* (2015.01)
*H04B 1/40* (2015.01)
*G06F 9/54* (2006.01)

(52) U.S. Cl.
CPC ........ *H04B 1/40* (2013.01); *G06F 9/54* (2013.01)

(58) Field of Classification Search
CPC .. H04B 1/40; H04B 3/23; H04B 1/403; G06F 9/54; H04L 27/2601; H04L 1/0025; H04L 25/4927; H04L 5/1438; H04L 27/2608; H04M 11/06; H04M 11/062
USPC ............... 375/222, 221, 220, 219, 295, 316
See application file for complete search history.

(56) References Cited

U.S. PATENT DOCUMENTS

2018/0062726 A1* 3/2018 Waight .................... H04B 7/08

* cited by examiner

*Primary Examiner* — Zewdu Kassa
(74) *Attorney, Agent, or Firm* — David L. Soltz (57) ABSTRACT

Systems and methods of tuning SerDes links between transmitter SerDes channels and receiver SerDes channels are described. Generally, the SerDes links may be tuned using a generic SerDes tuner implementation and a tuning algorithm. The tuning algorithm may have a first tuner interface specific to the transmitter SerDes device and a second tuner interface specific to the receiver SerDes device. The tuning algorithm may define a sequence of operations from the first tuner interface and the second tuner interface that when executed result in calibration of the SerDes link.

20 Claims, 8 Drawing Sheets

| Transmitting SerDes Identifier | Channel Identifier | Receiving SerDes Identifier | Channel Identifier | SerDes Link ID |
|---|---|---|---|---|
| 1 | 4 | 2 | 20 | 400 |
| 1 | 5 | 2 | 21 | 401 |
| 1 | 6 | 2 | 22 | 402 |
| 1 | 7 | 2 | 23 | 403 |
| 1 | 8 | 3 | 41 | 404 |
| 1 | 9 | 3 | 42 | 405 |
| 1 | 10 | 3 | 43 | 406 |
| 1 | 11 | 3 | 44 | 407 |
| 2 | 25 | 1 | 12 | 408 |
| 2 | 26 | 1 | 13 | 409 |
| 2 | 27 | 1 | 14 | 410 |
| 2 | 28 | 1 | 15 | 411 |
| 3 | 35 | 1 | 16 | 412 |
| 3 | 36 | 1 | 17 | 413 |
| 3 | 37 | 1 | 18 | 414 |
| 3 | 38 | 1 | 19 | 415 |

| LINK ID | Tuned | Status | Locked | Overflowed | Bit-error |
|---|---|---|---|---|---|
| 400 | Yes | Up | No | No | 0 |
| 401 | Yes | Up | No | No | 0 |
| 402 | Yes | Up | No | No | 0 |
| 403 | Yes | Up | No | No | 0 |
| 404 | Yes | Up | No | No | 0 |
| 405 | Yes | Up | No | No | 0 |
| 406 | Yes | Up | No | No | 0 |
| 407 | Yes | Up | No | No | 0 |
| 408 | Yes | Up | No | No | 0 |
| 409 | Yes | Down | No | No | 2 |
| 410 | Yes | Up | No | No | 0 |
| 411 | Yes | Up | No | No | 0 |
| 412 | Yes | Up | No | No | 0 |
| 413 | Yes | Up | No | No | 0 |
| 414 | Yes | Up | No | No | 0 |
| 415 | Yes | Up | No | No | 0 |

FIG. 8

GENERIC SERDES TUNING MODULE

FIELD OF THE DISCLOSURE

The disclosure generally relates to calibrating SerDes links in high-speed communication systems. In one implementation, aspects of the current disclosure relate to methodologies and systems of using a software module having a generic application programming interface for calibrating SerDes links connecting various transceiver devices in data plane software of high-speed data transport systems.

BACKGROUND

Serial communication links have become indispensable in data transfer, primarily in chip-to-chip communications over printed circuit boards and backplanes. Data rates of 10 Gbps may be common and rates as high as 30 Gbps may be feasible. Multi-Gigabit SerDes transceiver devices may be utilized in many backplane environments such as optical switching and chip-to-chip communications.

A Serializer/Deserializer (SerDes) is a pair of transmitting and receiving functional blocks commonly used in high-speed data communication. SerDes may run over long distances, use few wires, and thus may have lower costs than parallel interfaces with equivalent data throughput.

In a typical communication system, integrated circuits (ICs) may be chosen to support the system cost and performance targets. In the case of application-specific integrated circuits (ASICs), the semiconductor vendor and SerDes macro designs may be chosen. These communication systems may contain multi-vendor chips interconnected through electrical links. Each SerDes link may be individually calibrated or tuned by providing values for calibration parameters specific to type of transmitter and receiver SerDes channels of a link.

A typical hardware device may have a plurality of SerDes transceivers. The individual transmitter and receiver SerDes channels contained in a device may be accessed through an application programming interface. The software interface may consist of a set of operations that can be performed on individual SerDes channels contained in a device. SerDes interface functions take a channel number to identify a particular channel.

SerDes hardware designs may use several equalization techniques in various combinations in order to provide channel equalization for multi-gigabit SerDes links. Each SerDes design uses its own hardware specific parameters for calibrating its transmitter or receiver blocks. The calibration parameters values are determined based on link loss measured at a particular rate for each individual link. A calibration or tuning procedure includes configuring appropriate parameter values into transmitter and receiver blocks of a SerDes link.

In order to calibrate a SerDes link, a series of operations needs to be performed on transmitter and receiver channels of the link. The sequence of operations, which may include configuring specific calibration values into the link's transmitter and receiver SerDes channels, is performed to bring up a link for error free data communication and is called a tuning algorithm.

Currently within the art, SerDes tuning is typically implemented using custom product dependent application code. Product specific code contains data such as number of SerDes links, types of transmitter and receiver SerDes channels for each link, an interconnect map of links between devices containing those SerDes channels, and calibration parameters values for each individual link. The tuning algorithm for calibrating a SerDes link may depend on the type of SerDes transmitter and receiver blocks. Custom tuning code is tied to a particular product and is generally not reusable in other products. When a product has multi-vendor SerDes macros, common operations on SerDes links with different endpoint types are duplicated and code is not shared. Also, the algorithm used for tuning a set of links is hard-coded in the application and cannot be replaced or re-used. Testing and debugging link issues is laborious and repetitive and costs hours of engineering time. Diagnostics tools and application software used to bring up the links cannot share code resulting in longer development cycles.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

The mechanisms proposed in this disclosure circumvent the problems described above. The mechanisms proposed in this disclosure provide for a common application programming interface for manipulating individual SerDes links via a generic SerDes tuning software module. Additionally, methods and systems for calibrating and manipulating links between any SerDes device type using a generic interface is herein described.

Implementations described and claimed herein provide systems and methods for calibrating SerDes links in a high speed communication system. In one implementation, a platform and product independent software module may be used to create tuner objects, each of which operates and controls a set of SerDes links, wherein each SerDes link includes a SerDes transmitter (Tx) channel, a SerDes receiver (Rx) channel, and an electrical connection connected therebetween. A SerDes type is defined for each particular SerDes transceiver hardware, including the Tx and Rx channels, as a set of operations on a particular Tx or Rx SerDes channel. Each tuner object is associated with one or more links, such that Tx channels of the links share a common SerDes type and Rx channels of the links share a common Serdes type. A generalized code template or generic code is used to create tuner types, each of which corresponds to a specific pair of SerDes types (one SerDes type, a first SerDes type, being associated with the Tx channel coupled to the link and the other SerDes type, which may be the same as or different than the first SerDes type, being associated with the Rx channel coupled to the link). Tuner types, in turn, may be used to create tuner objects.

The generic code is independent of how SerDes links are connected in a particular product and includes APIs for passing product specific link data to each tuner object. Such product specific link data may include Tx and Rx channel device data, channel numbers, link identifiers, loss identifiers, and calibration parameters.

The module defines a set of common operations on a SerDes link in an application interface and may include a plurality of algorithms for tuning or calibrating SerDes links. The tuning algorithms are interchangeable and may be replaced at run time. The module may also include a tuning manager which maintains a registry of current tuner objects in a system and an integrated debugging interface to manipulate each link using an associated tuner object.

Described herein is an apparatus including at least one non-transitory computer readable medium storing a SerDes tuning software module having a plurality of tuning algorithms. The apparatus further includes a transmitter SerDes device, the transmitter SerDes device having a plurality of channels being able to receive instructions via a first application programming interface which is implemented by device's control software and stored within the at least one non-transitory computer readable medium. The apparatus also includes a receiver SerDes device having a plurality of receiver channels being able to receive instructions via a second application programming interface which is implemented by device's control software and stored within the at least one non-transitory computer readable medium. A SerDes link forms an electrically conductive connection from the serial transmitter to the serial receiver. A processor accesses a software module being processor executable code stored in its non-transitory computer readable medium. The software module when executed by the processor, causes the processor to receive a first data structure containing first references to the transmitter SerDes device and a first channel number identifying at least one transmitter SerDes channel and receive a second data structure containing second references to the receiver SerDes device and a second channel number identifying the receiver SerDes channel. The SerDes link is tuned using a generic SerDes tuner and a tuning algorithm. The tuning algorithm has a first tuner interface specific to the transmitter SerDes device and a second tuner interface specific to the receiver SerDes device. The tuning algorithm defines a sequence of operations from the first tuner interface and the second tuner interface that when executed result in calibration of the SerDes link.

In some embodiments, a first data structure may be received by the processor. The first data structure may contain references to a first Serializer-Deserializer and a first channel identifying a transmitter SerDes channel of the first Serializer-Deserializer. The processor may receive a second data structure containing references to a second Serializer-Deserializer and a second channel identifying a receiver SerDes channel of the second Serializer-Deserializer. The processor may access a database of tuning algorithms and select a first tuning algorithm based upon the transmitter SerDes channel of the first Serializer-Deserializer, and the receiver SerDes channel of the second Serializer-Deserializer. A SerDes link between the transmitter SerDes channel and the receiver SerDes channel may be tuned using a first tuning algorithm. The first tuning algorithm may be configured to use routines from a first application programming interface of the first Serializer-Deserializer, and a second application programming interface of the second Serializer-Deserializer.

In some embodiments, a SerDes communication system may include a transmitter SerDes device being able to receive instructions via a first application programming interface implemented by device's control software and stored within at least one non-transitory computer readable medium. The SerDes communication system may also include a receiver SerDes device being able to receive instructions via a second application programming interface implemented by device's control software and stored within the at least one non-transitory computer readable medium. A SerDes link may provide an electrically conductive connection from the transmitter SerDes device to the receiver SerDes device. A processor may access a software module of processor executable code stored in its non-transitory computer readable medium that when executed by the processor, causes the processor to implement a template type defined in the software module to generate a plurality of SerDes Tuners. At least a portion of the SerDes Tuners may include a generic SerDes tuner implementation. The template type may have two parameters. The first parameter may be an application programming interface to access the transmitter SerDes device. The second parameter may be an application programming interface to access the receiver SerDes device. The processor may generate a specific type of SerDes tuner by substituting the two parameters with specific interface types. The plurality of SerDes links may be calibrated using the SerDes Tuners.

DEFINITIONS

If used throughout the description and the drawings, the following short terms have the following meanings unless otherwise stated:

API stands for Application Programming Interface.
ASIC stands for Application-Specific Integrated Circuit.
IC stands for Integrated Circuit.
Generic is defined as a generalized software component in which algorithms may be written in terms of types to be specified later and are instantiated when needed for specific types provided as parameters.
PCB stands for printed circuit board.
SerDes stands for a Serializer/Deserializer, which is a pair of transmitting and receiving functional blocks commonly used in high-speed data communication.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
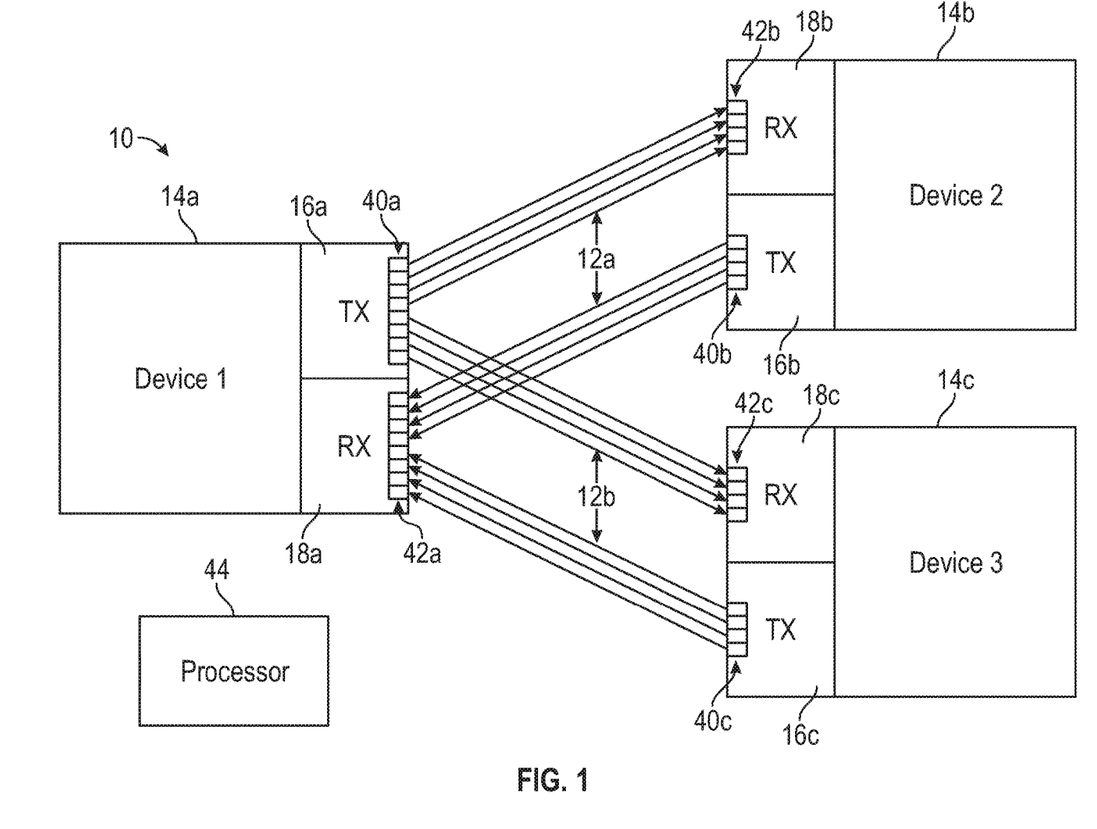
FIG. 1 is a block diagram of an exemplary SerDes system in accordance with the present disclosure.

Referring to FIG. 1, methods and systems will now be described for a Serializer-Deserializer (SerDes) system 10 that optimizes SerDes operation for one or more SerDes communication links 12. Generally, the SerDes system 10 is configured to convert parallel data transmission to serial data transmission and vice versa. The SerDes system 10 may be configured to tune (e.g., calibrate, adjust, correct) operation of one or more SerDes communication links 12 providing data communication between devices 14. For example, in FIG. 1, the SerDes system 10 may be configured to tune operation of SerDes communication link 12a providing serial data communication between a first device 14a and a second device 14b; the SerDes system 10 may also be configured to tune operation of SerDes communication link 12b providing serial data communication between the first device 14a and a third device 14c. Exemplary devices may include, but are not limited to ICs, for example. The SerDes communication link 12 may be formed of a single conductive path made of a conductive material, such as copper, silver or gold; or multiple conductive paths connected end to end with a connector connecting each pair of conductive paths, for example.

Figure 2:
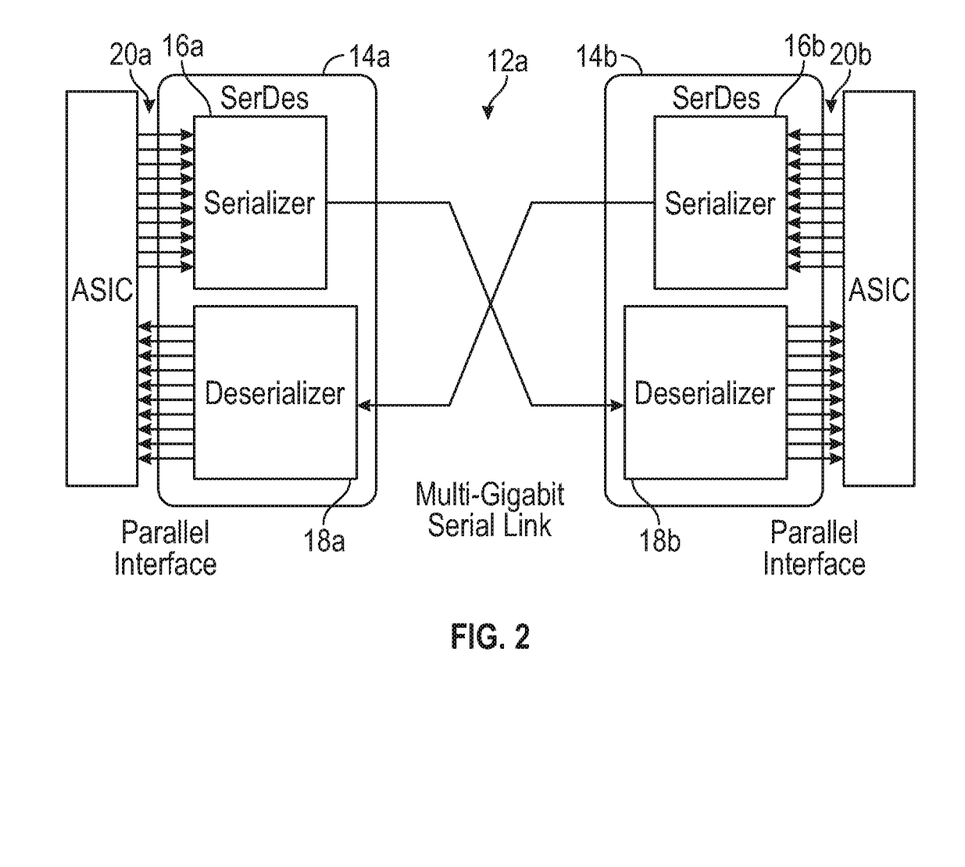
FIG. 2 is a block diagram of two SerDes devices connected to each other with two SerDes links, one in each direction for use in the SerDes system illustrated in FIG. 1.

Referring to FIGS. 1 and 2, the SerDes system 10 may include one or more transmitter SerDes devices 16a, 16b and 16c and one or more receiver SerDes devices 18a, 18b and 18c. FIG. 2 illustrates a portion of the SerDes system 10 illustrated in FIG. 1, and more particularly, the transmitter SerDes device 16a and 16b of devices 14a and 14b, respectively, and the receiver SerDes device 18a and 18b of devices 14a and 14b, respectively.

Referring to FIGS. 1 and 2, each device 14 may include one or more transmitter SerDes channels 40 and/or one or more receiver SerDes channels 42. FIG. 1 illustrates an exemplary SerDes system 10 having three devices 14a, 14b and 14c. The three devices 14a, 14b and 14c contain a plurality of transmitter SerDes channels 40 and receiver SerDes channels 42. For example, device 14a includes transmitter SerDes channels 40a and receiver SerDes channels 42a; device 14b includes transmitter SerDes channels 40b and receiver SerDes device 18b having receiver SerDes channels 42b; and, device 14c includes transmitter SerDes device 16c with transmitter SerDes channels 40c and receiver SerDes device 18c with receiver SerDes channels 42c. The transmitter SerDes channels 40 and the receiver SerDes channels 42 are interconnected using electrical paths in a particular manner determined by system and data path design.

Each transmitter SerDes channel 40 may include two or more parallel data input lines 20a and a serial data output line 22a. Any number of parallel data input lines 20 may be used. For example, the transmitter SerDes channel 40 in a gigabit Ethernet system may include ten parallel data input lines clocked at 125 MHz and a serial data output line clocked at 1.25 GHz.

The one or more receiver SerDes channels 42 may be the reverse of the one or more transmitter SerDes channels 40 in that the one or more receiver SerDes channels 42 may include a serial data input line 30b and two or more parallel data output lines 32b.

Generally, the SerDes communication links 12 may serve as transmission paths between transmitter SerDes channels 40 of the transmitter SerDes device 16a and receiver SerDes channels 42 of the receiver SerDes device 18b. In some embodiments, each SerDes communication link 12 may include multiple segments. In some embodiments, the electrically conductive connection may be a trace on a printed circuit board (PCB) and/or cable. In some embodiments, more than one PCB may be used with one or more PCBs connected by a connector such that each trace or wire between a connector may be considered to be a segment of the electrically conductive connection. Further, each segment of the electrically conductive connection may be analyzed separately from other segments and/or identified by an individual link ID as described in further detail herein.

Figure 3:
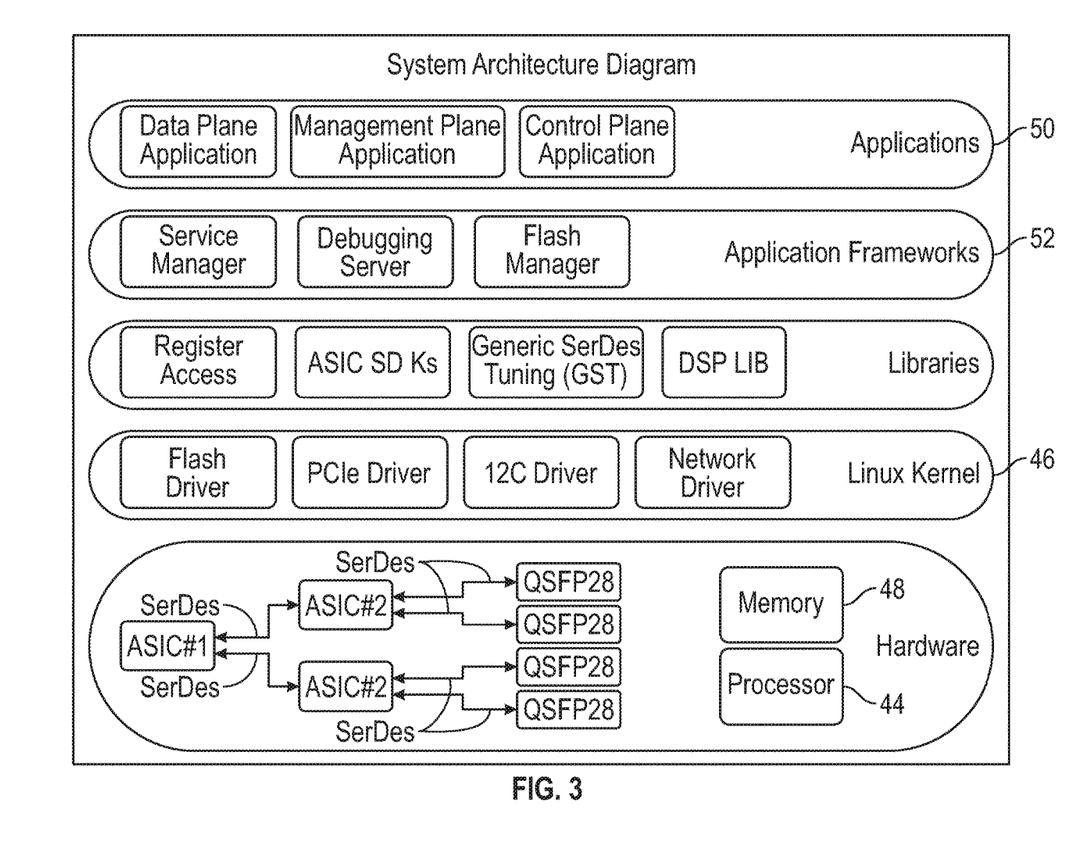
FIG. 3 is a system architecture diagram of an exemplary system using a generic SerDes Tuning module to calibrate links in the SerDes system illustrated in FIG. 1.

Referring to FIGS. 1-3, the SerDes system 10 may include a processor 44 and memory 48. The processor 44 will be described herein by way of example as a processor 44 within a telecommunication node.

The processor 44 may execute code instructions to access the hardware devices containing transmitter and receiver SerDes channels 40 and 42. Processor 44 may include one or more processors, such as one or more microprocessors, and/or any processing logic (e.g., a field-programmable gate array ("FPGA"), an application specific integrated circuit ("ASIC"), etc.) that may interpret and/or execute instructions.

Referring to FIG. 3, the SerDes system 10 may include one or more device drivers 46, one or more memory 48, and one or more applications 50. In some embodiments, the processor 44 may also include one or more application framework software 52 for use in methods as described herein. For example, the processor 44 may provide one or more application frameworks (service manager, debugging server, flash manager).

The device drivers 46 are software components permitting the processor 44 and one or more external devices to communicate and may include, but are not limited to, a flash driver, a peripheral component interconnect express (PCIe) driver, an Intel I2C driver, a network driver, and/or the like.

The one or more memories 48 may store processor executable code and/or information comprising one or more database 54 and program logic 56 (i.e., computer executable logic). In some embodiments, the processor executable code may be stored as a data structure, such as, for example, a database and/or data table. For example, database 54 and/or program logic 56 may include, but are not limited to, ASIC software development kits (SDKs), digital signal processor Library (DSPLIB), register access library, and/or the like.

The applications 50 may include a management plane application, a control plane application and a data plane application. The management plane application may configure, monitor and/or provide management monitoring and/or configuration services to all layers of the SerDes system 10. The control plane application may be used to set up and activate one or more paths within a telecommunication network, and thereby determine the timing and routing of data transmitted by the data plane. The data plan refers to all functions and/or processes forwarding data from one interface to another interface. The data plane application configures and monitors the data path. Generally, calibration of the SerDes communication links 12 is provided via the data plane application. To that end, the data plane application may perform operations on one or all of the transmitter and receiver SerDes channels 40 and 42 in the SerDes system 10.

Figure 4:
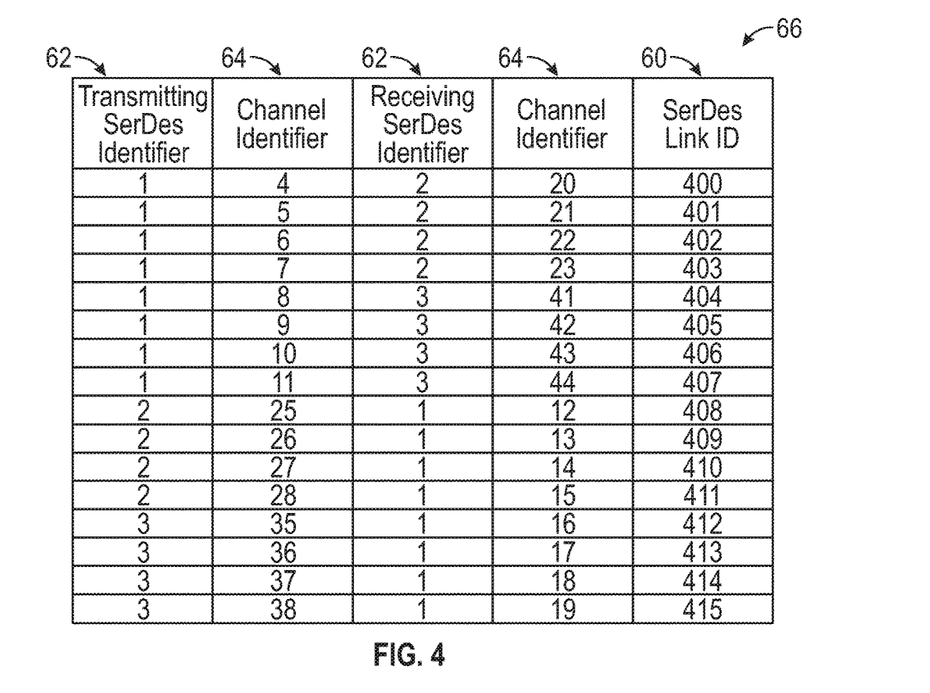
FIG. 4 is a data table assigning device identifiers, channel identifiers and unique SerDes link identifiers for the SerDes system illustrated in FIG. 1.

Referring to FIGS. 1 and 4, a SerDes link identifier may uniquely identify each SerDes communication link 12 and include the transmitter SerDes channel 40, the receiver SerDes channel 42 and the electrical path there between. Each device 14 may be assigned a device identifier 62 and each SerDes channel in the device a channel identifier 64. FIG. 4 illustrates a data table 66 with assignments of device identifiers 62, channel identifiers 64 and SerDes link identifiers 60 for the SerDes system 10 illustrated in FIG. 1.

Device identifiers 62 may be any symbol configured to uniquely identify each device 14. Generally, the device identifier 62 may be used to locate the driver for the device 14 and/or device references. In some embodiments, the device identifier 62 may include, but is not limited to, alphanumeric characters, fanciful symbols and/or the like. In some embodiments, device identifiers 62 may be a reference such as a computer memory address used to access device operations, a floating point identifier, look-up value, and/or the like. In some embodiments, as illustrated in FIG. 4, each device 14 may be enumerated using an integer as the device identifier 62. For example, device 14a may be enumerated by the integer 1, device 14b may be enumerated by the integer 2, and device 14c may be enumerated by the integer 3.

Channel identifiers 64 may be used to uniquely identify each transmitter or receiver SerDes channel 40 or 42. In some embodiments, the channel identifier 64 may include, but is not limited to, alphanumeric characters, fanciful symbols and/or the like. In some embodiments, channel identifiers 64 may be a floating point identifier, look-up value, and/or the like. For example, in some embodiments, each transmitter SerDes channel 40 and/or receiver SerDes channel 42 may be enumerated by an integer identifier as the channel identifier. Referring to FIG. 4, device 14a may be provided the integer '1' for the device identifier 62, the integers '4, 5, 6, 7, 8, 9, 10 and 11' as the channel identifiers 64 for the transmitter SerDes channels 40 of the transmitter SerDes device 16a, and the integers '12, 13, 14, 15, 16, 17, 18 and 19' as channel identifier 64 for the receiver SerDes channels 42 of the receiver SerDes device 18a. Device 14b may be provided the integer '2' for the device identifier 62, the integers '25, 26, 27 and 28' as channel identifiers 64 for the transmitter SerDes channels 40 of the transmitter SerDes device 16b, and the integers '20, 21, 22, and 23' as channel identifiers 64 for the receiver SerDes channels 42 of the receiver SerDes device 18b. Device 14c may be provided the integer '3' for the device identifier 62, the integers '35, 37, 38 and 39' as channel identifiers 64 for transmitter SerDes channels 40 of the transmitter SerDes device 16c, and the integers '41, 42, 43 and 44' as channel identifiers 64 for the receiver SerDes channels 42 of the receiver SerDes device 18c.

Figure 5:
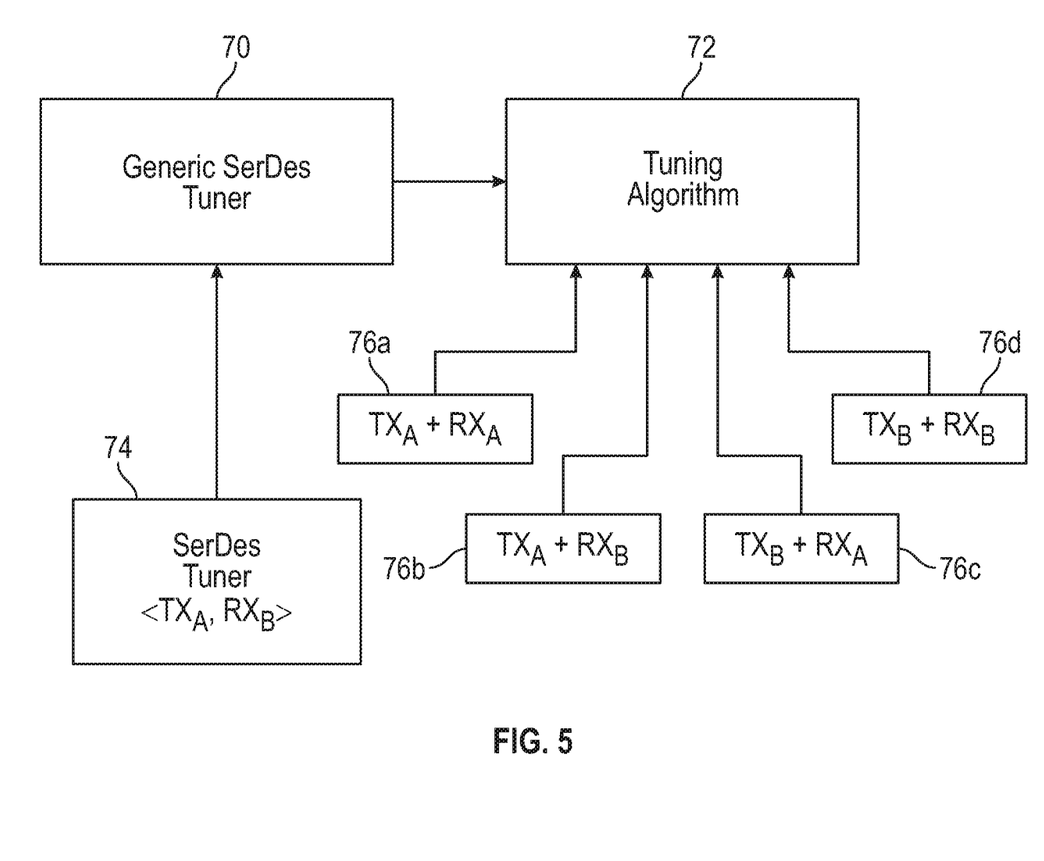
FIG. 5 is a block diagram illustrating a generic SerDes tuner dispatching a generic operation to be executed by a specific algorithm for use in the processor illustrated in FIG. 3.

Referring to FIGS. 1, 3 and 5, common operations on the SerDes communication link 12 may be made via a programming interface (e.g., a programming interface entitled tuning algorithm). Common operations on the SerDes communication link 12 may include, but are not limited to, tuning the SerDes communication link 12, obtaining status of the SerDes communication link 12, and/or the like.

For each type of transmitter SerDes device 16, a set of routines may be defined in a tuning interface. The tuning interface may include functions for manipulating both transmitter SerDes channels 40 and receiver SerDes channels 42 of a specific type. Each device 14 may contain the same type of transmitter SerDes channels 40 and receiver SerDes channels 42 (e.g., make and model). Different devices 14 may contain different types of transmitter SerDes channels 40 and/or receiver SerDes channels 42. The set of routines may manipulate transmitter or receiver SerDes channels 40 or 42 of that specific type (e.g., make and model). Each routine in the tuning interface may identify a channel number as a parameter (i.e., channel identifiers 64) and perform one or more operations on the identified transmitter or receiver SerDes channel 40 or 42.

Generally, the algorithm for tuning the SerDes communication link 12 may be associated with a SerDes programming interface of the transmitter SerDes device 16 and a SerDes programming interface of the receiver SerDes device 18. In some embodiments, multiple algorithms for the same pair of tuning interfaces may be defined. For example, tuning of the SerDes communication link 12 may include a coarse tuning algorithm, a fine tuning algorithm, and/or the like, with the coarse tuning applying calibration parameters to the transmitter SerDes channel 40a followed by the receiver SerDes channel 42b, for example. In comparison, a fine tuning may include examining link status data and executing a different sequence of tuning routines. Each tuning algorithm may include a corresponding enumerator. The tuning algorithm may be selected, for example, by calling "Set Tuning Algorithm" function of a tuner with the algorithm's enumerator. Tuning algorithms may be interchangeable and can be changed at run time.

Referring to FIG. 5, a generic SerDes tuner 70 may be established for interfacing and/or calibrating each SerDes communication link 12. Generally, the generic SerDes tuner 70 defines a set of operations that may be performed on any SerDes communication link 12 regardless of vendor and/or design of the transmitter SerDes device 16 and/or the receiver SerDes device 18. The generic SerDes tuner 70 may be associated with a tuning algorithm 72.

The tuning algorithm 72 is a sequence of operations defined for a specific pair of tuning interfaces, one for the transmitter SerDes devices 16 and other for the receiver SerDes devices 18, that when executed result in calibration of the link. The tuning algorithm 72 incorporates a transmitter tuning interface of the transmitter SerDes device 16 (shown as $TX_A$ and $TX_B$ in FIG. 5), and a receiver tuning interface of the receiver SerDes device 18 (shown as $RX_A$ and $RX_B$ in FIG. 5) for each SerDes communication link 12. The generic SerDes tuner 70 dispatches tuning operations to the tuning algorithm 72 with associated tuning interfaces for the transmitter SerDes device 16 (e.g., $TX_A$ for the SerDes Tuner 74 in FIG. 5) and the receiver SerDes device 18 (e.g., $RX_B$ for the SerDes Tuner 74 in FIG. 5).

Each SerDes tuner 74 is associated with a pair of tuning interface types: a transmitter tuning interface and a receiver tuning interface. To that end, a template type (i.e., SerDes-Tuner <$TX_N$, $RX_N$>) having specific tuning algorithms 76 with two parameters may be defined to generate a particular type of tuner. The parameters are, for example, tuning interface types of transmitter SerDes channels 40 and tuning interface types of receiver SerDes channels 42. A plurality of combinations of such interfaces may be made. The tuning algorithm 72 defines operations that every specific tuning algorithm 76 has to perform. In FIG. 5, the tuning algorithm 76a has the transmitter tuning interface for $TX_A$ and the receiver tuning interface for $RX_A$. The tuning algorithm 76b has the transmitter tuning interface for $TX_A$ and the receiver tuning interface for $RX_B$. The tuning algorithm 76c has the transmitter tuning interface for $TX_B$ and the receiver tuning interface for $RX_A$. The tuning algorithm 76a has the transmitter tuning interface for $TX_B$ and the receiver tuning interface for $RX_B$.

In some embodiments, a set of homogenous transmitter SerDes devices 16 may be transmitting data to a set of homogenous receiver SerDes devices 18. A particular transmitter SerDes channel 40 or receiver SerDes channel 42 can be uniquely identified by a pair of device identifiers 62 and channel identifiers 64. A particular SerDes communication link 12 connecting the transmitter SerDes channel 40 to the receiver SerDes channel 42 can be represented by two pairs of device and channel identifiers 62 and 64 respectively. Link data may also contain a system wide unique identifier for the link and or electrical characteristics of the link such as link loss at a particular rate. Link interconnect data is a table of link data for a number of links connecting two sets of transmitter and receiver SerDes devices 16 and 18 respectively and is product specific data.

Figure 6:
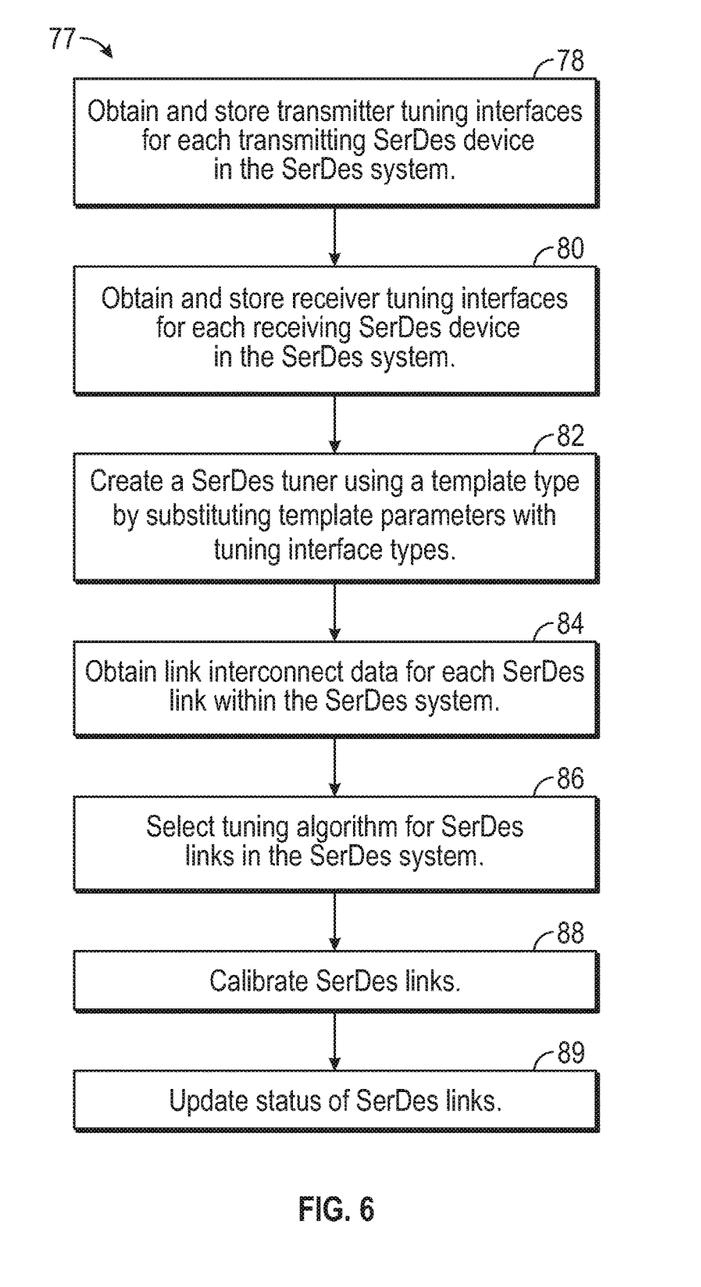
FIG. 6 is a flow chart illustrating an exemplary method of configuring a particular SerDes tuner in accordance with the present disclosure.

FIG. 6 is a flow chart 77 illustrating an exemplary method of configuring a SerDes Tuner 74. In a step 78, the processor 44 may obtain and store transmitter tuning interfaces for each transmitter SerDes device 16 of the SerDes system 10. For example, transmitter SerDes device 16 may be enumerated and references to each device may be added to an ordered container. Object oriented programming language is used herein for clarity, however, it should be noted that any programming language models may be used in accordance with the present disclosure. In a step 80, the processor 44 may obtain and store receiver tuning interfaces for each receiver SerDes device 18 of the SerDes system 10. For example, receiver SerDes devices 18 may be enumerated and references to each device may be added to an ordered container. In a step 82, the processor 44 may create a SerDes tuner 74 using a template type by substituting template parameters with interface types of transmitter SerDes channels 40 and receiver SerDes channel 42. For example, the SerDes tuner 74 may include particular transmitter SerDes device (e.g., $TX_A$ in FIG. 5) and receiver SerDes device (e.g., $RX_B$ in FIG. 5), and as such, may be initialized using TX and RX containers and a unique name.

Initially, the SerDes tuner 74 has no links. In a step 84, SerDes links may be added to the SerDes tuner by providing a table of link interconnect data to the SerDes tuner. In a step 86, the processor 44 may select a specific tuning algorithm from a set of predefined algorithms for SerDes communication links 12 within the SerDes system 10. Once a tuning algorithm is select, in a step 88, the processor 44 may calibrate the SerDes communication links 12 (e.g., single link, multiple links or all links). In a step 89, the processor 44 may update link status of the SerDes communication links 12. It should be noted that link status may be updated at any point of time to reflect the current status of each SerDes communication link 12.

Even for the same pair of tuning interfaces, however, multiple tuning algorithms may be defined. For example, a coarse tuning algorithm may apply calibration parameters to an endpoint of the transmitter SerDes device 16 followed by an endpoint of the receiver SerDes device 18. In another example, a fine tuning application may examine link status data and execute another sequence of tuning routines.

Figure 7:
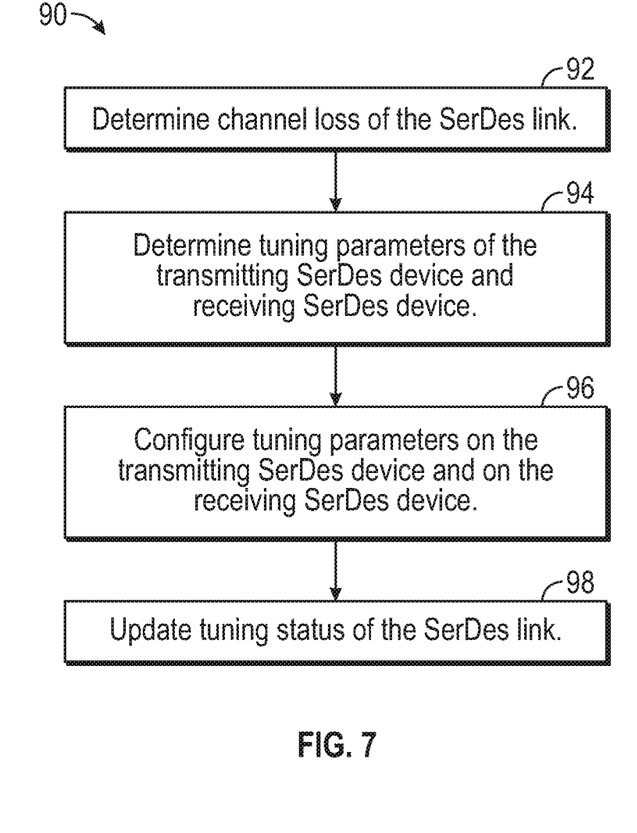
FIG. 7 is an exemplary flow chart of a tuning algorithm used to calibrate a SerDes link using the SerDes tuner formed in FIG. 6.
Figure 8:
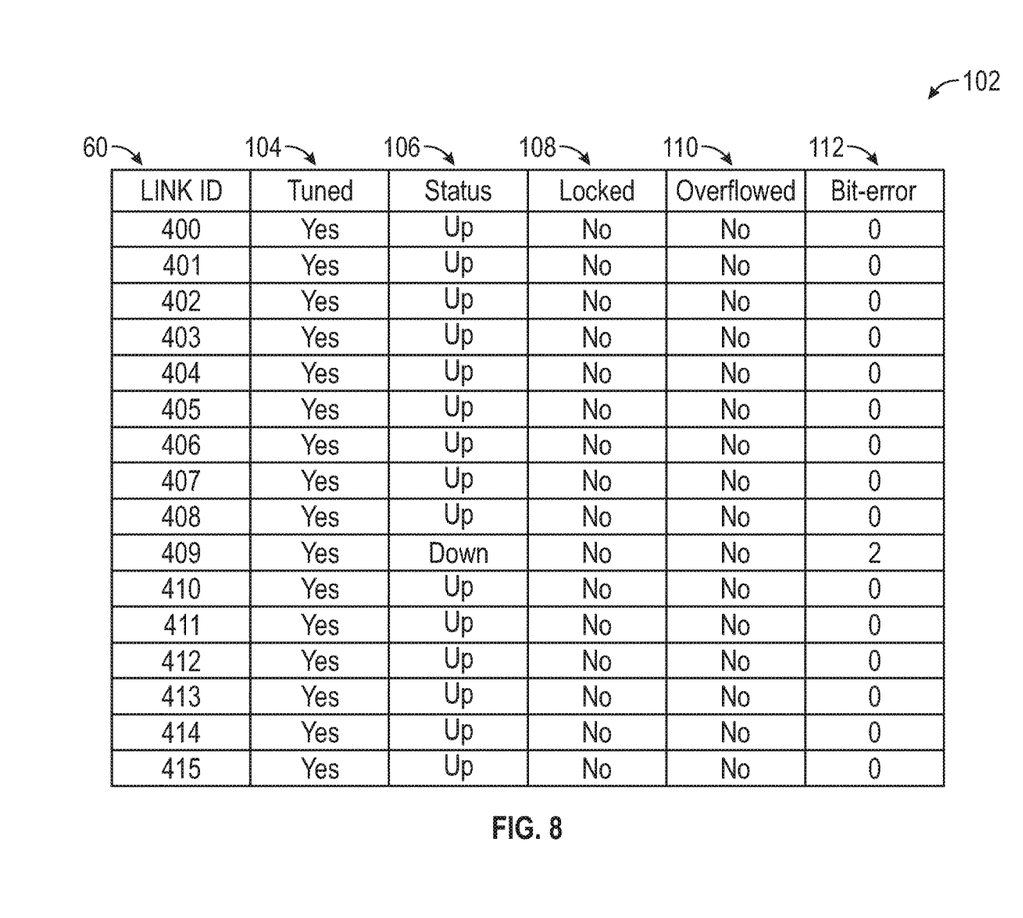
FIG. 8 is a data table displaying tuning status, link status, locked status, overflow status, and number of bit errors for links of the SerDes system illustrated in FIG. 1.

FIG. 7 illustrates a flow chart of a tuning algorithm used to calibrate a SerDes link using the SerDes tuner formed in FIG. 7. In some embodiments, status of the SerDes communication link 12 may be initialized to default values and updated by operations of the SerDes communication link 12. Such status may be accessed along with other data of the SerDes communication link 12 via the SerDes link identifier 60 as shown in table 102 of FIG. 8. Status identifiers may include, but are not limited to, tuning status 104, running status 106, locked status 108, overflow status 110, link loss 112, and/or the like.

In a step 92, link loss 112 (i.e., channel loss) of the SerDes communication link 12 may be determined. Each SerDes communication link 12 may have link loss 112. Link loss 112 may be based on data rate and stored within one or more database 54 (e.g., loss table). For example, link loss 112 for each SerDes communication link 12 may be measured for a particular data rate and stored in one or more database 54 (e.g., loss database). SerDes communication links 12 having multiple segments (e.g., SerDes communication link 12 with segments on pluggable modules) may determine link loss 112 by summing each segment of the SerDes communication link 12 to obtain a total link loss 112. In some embodiments, when a non-zero link loss 112 is provided as part of the data of the SerDes communication link 12, the step determining link loss may be bypassed.

In a step 94, tuning parameters of the transmitter SerDes device 16 and the receiver SerDes device 18 may be determined. Tuning parameters may be specific to each transmitter SerDes device 16 and each receiver SerDes device 18. As such, tuning parameters may reflect the hardware technology used to design software related to the SerDes system 10. Tuning parameters may include, but are not limited to data provided in one or more database 54 (e.g., tuning database), link loss of the SerDes communication link 12, source (e.g., transmitter SerDes device 16 or receiver SerDes device 18), destination (e.g., transmitter SerDes device 16 or receiver SerDes device 18), and/or data rate of the SerDes communication link 12.

In a step 96, the processor 44 may configure tuning parameters on the transmitter SerDes device 16 and on the receiver SerDes device 18. In a step 98, the tuning status 104 of the SerDes communication link(s) 12 may be updated. Additionally, other status of each of the SerDes communication link(s) 12 may be updated including running status 106, locked status 108, and overflow status 110. For example, running status 106 may be updated to provide an evaluation of whether traffic may be carried on the SerDes communication link 12. In order to test the SerDes communication link 12, traffic may be determined (e.g., PRBS traffic). Such traffic may be generated on the transmitting end of the SerDes communication link 12 and evaluated on the receiving end of the SerDes communication link 12. Regarding locked status 108, the locked status 108 at any moment of time may indicate whether the receiving end of the SerDes communication link 12 is receiving one or more expected patterns. Overflow status 110 may indicate that the maximum number of bit errors that have occurred. Bit errors indicate how many errors have occurred since the receiving end of the SerDes communication link 12 initiated evaluation of the one or more expected patterns.

In some embodiments, a SerDes Tuner Manager (STM) application may be provided. The STM application may be used to register and keep track of all SerDes tuners in the SerDes system 10. For example, upon creation of a SerDes tuner (as described in further detail herein), the SerDes tuner may be registered with the STM application. Each SerDes tuner may have a unique name (i.e., identifier) that may be used to register and/or access the SerDes tuner via the STM application. If the SerDes tuner is removed from the SerDes system 10, the SerDes tuner may be unregistered with the STM application.

In some embodiments, the generic SerDes tuner 70 may include a debugging module. To that end, the debugging module may include a set of generic commands. For each SerDes communication link 12, the transmitter SerDes device 16 and receiver SerDes device 18, interconnection data for the SerDes communication link 12, status of the SerDes communication link 12, calibration parameters for each SerDes communication link 12, and/or the like may be provided. One or more SerDes communication links 12 may be tuned and/or calibrated. Further, status of the SerDes communication link 12 may be updated for one or more SerDes communication links 12. PRBS tests may be initiated, ceased, and/or results displayed or deleted automatically and/or manually.

CONCLUSION

Implementations described herein provide a common programming interface for interfacing and/or calibrating SerDes communication links 12 within SerDes systems 10. Further, a template type is defined to generate a specific SerDes tuner type for each pair of transmitter and receiver SerDes channel types. The SerDes tuner types may be implemented in terms of a generic SerDes tuner type providing a common implementation for the SerDes tuner. The SerDes tuner may be configured with a generic SerDes tuner and a pair of tuning interfaces associated with the transmitter and receiver SerDes devices 16 and 18 respectively. Further, the implementations described herein provide a template type having two parameters to generate specific types of SerDes tuners for a tuning module. The first template parameter may be a type of application programming interface used to access a transmitter device. The second template parameter may be a type of interface used to access a receiver device. These specific types of tuners may enforce the type safety and may be implemented via use of a generic SerDes tuner. The template type may define the public interface of the tuning module.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network. It should be understood that the methods described herein may be applied to any protection or protection scenario for any mesh network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. An apparatus, comprising:
   at least one non-transitory computer readable medium storing a SerDes tuning software module having a plurality of tuning algorithms;
   a transmitter SerDes device having a plurality of transmitter SerDes channels, the transmitter SerDes channels being able to receive instructions via a first application programming interface which is implemented by first control software of the transmitter SerDes device and stored within the at least one non-transitory computer readable medium;
   a receiver SerDes device having a plurality of receiver SerDes channels, the receiver SerDes channels being able to receive instructions via a second application programming interface which is implemented by second control software of the receiver SerDes device and stored within the at least one non-transitory computer readable medium;
   a SerDes link being an electrically conductive connection from the transmitter SerDes channels to the receiver SerDes channels;
   a processor, accessing a software module being processor executable code stored in its non-transitory computer readable medium that when executed by the processor, causes the processor to:
      receive a first data structure containing first references to the transmitter SerDes device and a first channel number identifying a first transmitter SerDes channel;
      receive a second data structure containing second references to the receiver SerDes device and a second channel number identifying a first receiver SerDes channel corresponding to the first transmitter SerDes channel; and,
      tune the SerDes link between the first transmitter SerDes channel and the first receiver SerDes channel using a generic SerDes tuner, and a tuning algorithm, the tuning algorithm having a first tuner interface specific to the transmitter SerDes device and a second tuner interface specific to the receiver SerDes device, the tuning algorithm defining a sequence of operations from the first tuner interface and the second tuner interface that when executed result in calibration of the SerDes link.

2. The apparatus of claim 1, wherein tuning the SerDes link further includes determining link loss across the electrically conductive connection.

3. The apparatus of claim 2, wherein the electrically conductive connection is a plurality of traces on printed circuit boards with each printed circuit board configured to be connected.

4. The apparatus of claim 1, wherein each trace is a segment of the electrically conductive connection with link loss determined for each segment.

5. The apparatus of claim 1, wherein the first data structure contains a reference to the transmitter SerDes device.

6. The apparatus of claim 2, wherein the second data structure contains a reference to the receiver SerDes device.

7. The apparatus of claim 1, wherein the processor further determines status of the SerDes link after tuning the SerDes link.

8. The apparatus of claim 1, wherein the processor identifies the transmitter SerDes device and the receiver SerDes device by a device identifier.

9. The apparatus of claim 1, wherein the tuning algorithms are stored within at least one computer readable medium.

10. A method, comprising:
receive a first data structure containing references to a first Serializer-Deserializer and a first channel identifying a transmitter SerDes channel of the first Serializer-Deserializer;
receive a second data structure containing references to a second Serializer-Deserializer and a second channel identifying a receiver SerDes channel of the second Serializer-Deserializer;
accessing a database of tuning algorithms and selecting a first tuning algorithm based upon the transmitter SerDes channel of the first Serializer-Deserializer, and the receiver SerDes channel of the second Serializer-Deserializer; and
tuning a SerDes link between the transmitter SerDes channel and the receiver SerDes channel with a first tuning algorithm and a generic SerDes tuning application, the first tuning algorithm configured to use routines from a first application programming interface of the first Serializer-Deserializer, and a second application programming interface of the second Serializer-Deserializer.

11. The method of claim 10, wherein tuning the SerDes link further includes selecting the first tuning algorithm to be used by the generic SerDes tuning application.

12. The method of claim 11, wherein the generic SerDes tuning application further includes an integrated debugging interface.

13. The method of claim 11, further comprising the step of identifying each connection between the first Serializer-Deserializer and the second Serializer-Deserializer with a unique SerDes link identifier.

14. The method of claim 13, further comprising the step of updating status of each SerDes link identifier.

15. The method of claim 10, wherein references are a plurality of computer memory addresses used to access device operations.

16. The method of claim 10, wherein the tuning algorithms are a set of pre-determined tuning algorithms for multiple combinations of SerDes components.

17. A SerDes communication system, comprising:
a transmitter SerDes device being able to receive instructions via a first application programming interface implemented by first control software of the transmitter SerDes device and stored within at least one non-transitory computer readable medium;
a receiver SerDes device being able to receive instructions via a second application programming interface implemented by second control software of the receiver SerDes device and stored within the at least one non-transitory computer readable medium;
a SerDes link being an electrically conductive connection from the transmitter SerDes device to the receiver SerDes device;
a processor, accessing a software module being processor executable code stored in its non-transitory computer readable medium that when executed by the processor, causes the processor to:
implement a template type defined in the software module to generate a plurality of SerDes Tuners wherein at least a portion of the SerDes Tuners includes a generic SerDes tuner implementation, the template type having a first parameter being a first application programming interface to access the transmitter SerDes device, a second parameter being a second application programming interface to access the receiver SerDes device;
generate a specific type of SerDes tuner by substituting the first and second application programming interfaces with specific interface types; and,
calibrate a plurality of SerDes links using the SerDes Tuners.

18. The SerDes communication system of claim 17, wherein accessing a software module further causes the processor to access a tuning manager configured to track SerDes tuners within the SerDes communication system using unique tuner identifiers.

19. The SerDes communication system of claim 17, wherein the generic SerDes tuner includes a debugging interface.

20. The SerDes communication system of claim 17, wherein the generic SerDes tuner is used in a data plane application.

* * * * *